(12) United States Patent  
Maher et al.

(10) Patent No.: US 6,687,642 B2
(45) Date of Patent: Feb. 3, 2004

(54) CONDITION RESPONSIVE SENSE SYSTEM AND METHOD

(75) Inventors: Thomas R. Maher, Rehoboth, MA (US); John A. Powning, Providence, RI (US)

(73) Assignee: Texas Instruments Incorporated, Dallas, TX (US)

( * ) Notice: Subject to any disclaimer, the term of this patent is extended or adjusted under 35 U.S.C. 154(b) by 5 days.

(21) Appl. No.: 10/036,719

(22) Filed: Dec. 21, 2001

(65) Prior Publication Data

US 2002/0103613 A1 Aug. 1, 2002

Related U.S. Application Data

(60) Provisional application No. 60/264,473, filed on Jan. 26, 2001.

(51) Int. Cl.[7] .................................................. G01D 1/00
(52) U.S. Cl. ..................................................... 702/127
(58) Field of Search ................................. 702/127, 189; 700/297, 286; 346/38; 340/853; 364/551, 156; 73/489; 365/189; 701/50; 62/66; 320/106

(56) References Cited

U.S. PATENT DOCUMENTS

H81 H * 7/1986 Szabo et al. ................... 346/38

5,014,238 A * 5/1991 McLeish et al. ............. 702/189
5,068,811 A * 11/1991 Johnston et al. ............. 700/297

* cited by examiner

*Primary Examiner*—John Barlow
*Assistant Examiner*—Tung Lau
(74) *Attorney, Agent, or Firm*—Russell E. Baumann; Frederick J. Telecky, Jr.

(57) ABSTRACT

An application specific integrated circuit or ASIC (MSC) is connected to a plurality of bridge type sense elements (1–6) for analog multiplexing (10a, 10b, 10c) the outputs from a selected sense element to a common signal conditioning path (10f). The bridge type sense elements are biased through an electronically programmable resistor (10d1) to derive a temperature signal. The signal conditioning path provides electronically programmable correction for offset and gain proportional to the sensed condition, e.g., fluid pressure. Complete sensor characterization data provided at the time of manufacture is stored in non-volatile memory (10h) which is downloaded to a host controller (12) on command. The ASIC also includes diagnostic test bridges (BR1, BR2) for diagnosing ASIC faults and a signal diagnostic path (10m) for diagnosing sense element and sense element connection faults. Characterization data downloaded to the host controller enables the controller to mathematically correct remaining temperature, condition (e.g., pressure) and diagnostic signal errors,

20 Claims, 8 Drawing Sheets

CONDITION RESPONSIVE SENSE SYSTEM AND METHOD

RELATED APPLICATIONS

Benefit is claimed under 35 U.S.C. 119(e)(1) of U.S. Provisional Application No. 60/264,473 filed Jan. 26, 2001.

FIELD OF THE INVENTION

This invention relates generally to systems for sensing a condition at a plurality of locations and more particularly to systems for conditioning multiple sense elements with a common electronic circuit.

BACKGROUND OF THE INVENTION

Many applications call for the sensing of a condition, such as pressure, acceleration, torque and force, at a plurality of locations. By way of example in the automotive environment, electro-hydraulic brake or EHB systems generally have six locations that require sensing of the fluid pressure. Pressure sensing is required at each wheel for closed loop brake force control, at a location to sense driver input and at the pressure accumulator to sense system reserve pressure. Hydraulic sensing points are all routed through the hydraulic control unit or HCU having a system controller, i.e., microprocessor, so that there exists one member at which all different hydraulic circuit pressures are sensed. The provision of six discrete pressure sensors with full conditioning electronics results in suitable operation; however, it also results in a total pressure sensor cost which is higher than desirable compared to the remaining system component costs.

SUMMARY OF THE INVENTION

It is therefore, an object of the present invention to provide a reliable yet lower cost condition responsive sense system than the prior art system referenced above. Yet another object is the provision of a relatively low cost, accurate and reliable sense system responsive to pressure, acceleration, torque, force and the like and to an improved low cost method for conditioning condition responsive sense elements.

Briefly stated, in a condition responsive sense system made in accordance with the invention, a plurality of sense elements are connected to an ASIC with the output of any selected sense element being connected to a common signal conditioning circuit path by analog multiplexing. The sense element signal is conditioned by the signal conditioning circuit of the ASIC to provide partial conditioning comprising basic calibration data. Complete characterization data for all the sense elements is stored in non-volatile memory of the ASIC and is transferred to a host controller, e.g., microprocessor, upon command to enable the host controller to perform appropriate mathematical operations to provide the additional amount of compensation required to complete the signal conditioning. According to a feature of the invention, a diagnostic circuit path is included in the ASIC for diagnosing sense element and sense element connection faults. According to another feature, first and second fixed test sense elements are formed in the ASIC for diagnosing ASIC faults.

According to a preferred embodiment of the invention, the sense elements may be formed of individual strain bridges known in the art, such as silicon resistor bridges bonded to a diaphragm through glass material fired at high temperatures and adapted for placement in a fluid pressure port. When pressurized, fluid is present in the pressure port and the diaphragms and bridges will undergo elastic strain. Because the resistors in the bridge are made of silicon, they exhibit a piezoresistive effect exhibiting a change in resistance when subjected to strain. By applying a voltage to the bridge, a small voltage change results at the output of the bridges. In the described embodiment, a circuit for six sense elements is shown; however, it will be realized that the circuit can be modified to accommodate more or fewer sense elements as desired.

According to the preferred embodiment described, a bridge bias is provided through an electronically programmable resistor in series with the strain bridge. The resistor can be set either to a specific value in order to derive a temperature signal from the bridge or it can be set at zero to bias the bridge with the full supply voltage. Selection of the bias resistor value is accomplished via selection of a register value. Generation of the temperature signal utilizes the bridge temperature coefficient of resistance (TCR) to form a voltage divider with the low/zero TRC programmable resistor. Derivation of the temperature signal by this means is conventional.

In accordance with the invention, the bridge conditioning circuit functions with one bridge at a time, therefore, a means of switching bridge bias and each bridge output to the conditioning circuit input is provided. This is accomplished via analog multiplexers. The input to the conditioning circuit is controlled by three register values. All bridges are connected to a terminal of the ASIC at all times. In addition to the six pressure sensor inputs, two reference bridges are also included in the circuit and are selected via the analog multiplexer registers for the purpose of circuit diagnostic testing. The function of the reference bridges will be explained more below.

Electronically programmable Offset and Gain correction of the signal proportional to pressure is provided through control of respective registers. This minimal amount of calibration is required to maximize the output range of the pressure signal in order to use the largest possible input range of the Analog to Digital Converter (ADC). By using this approach, the bit resolution of the ADC block can be reduced to the minimum acceptable level thereby reducing the size and cost of this circuit element. Optional input Low Pass Filters are provided to attenuate high frequency noise sources (e.g., EMI), and optional low pass filters at the output of the electronically programmable gain stages are provided to tailor the system to meet customer frequency response characteristics.

Diagnostic functions are implemented through two portions of the circuitry. The first is a sense element diagnostic circuit which:

Provides an offset corrected and amplified signal proportional to the addition of the selected bridge output signals. Ideally, the output of the sense element diagnostic circuit is independent of pressure and temperature and, therefore, changes in this parameter can be used to indicate sense element failures (e.g., bridge parameter drift or hard failure). System comparison of the compensated output, with the value stored at the time of manufacture, is performed to determine if the sense element performance has degraded. Due to manufacturing tolerances, there will be a pressure and temperature dependence, which will reduce the accuracy of the sense element diagnostic signal and reduce system level error detection capability. System use of the pressure and temperature signal from the selected bridge provide a means of correcting pressure and temperature related sense element diagnostic signal errors allowing for more accurate analysis and finer error detection capability.

The second portion of the circuitry for providing diagnostic function, first and second reference bridges:

The function of the reference bridges is to input a fixed bridge signal proportional to 0 and full-scale bridge outputs, respectively. Pressure, temperature and sense element diagnostic signals are calibrated at the time of manufacture and stored in ASIC Non-Volatile memory. When the test modes are activated, the system can analyze the pressure, temperature and sense element diagnostic output signals, compare the outputs with the values stored at the time of manufacture, and determine if circuit performance has degraded or malfunctioned. Use of the 0 and full-scale reference bridges fully exercises the full operating range of all circuit paths providing extensive diagnostic capability.

A digital port function is provided to transmit data to and receive data from the host or system controller. The system controller inputs a command to the conditioning electronics, which in turn, performs the function requested by the controller. For example, the controller may request pressure information from sense element 2. The Digital Port receives the command and a Logic Control block verifies (e.g., parity check) and decodes the command. The Logic Control block then sets the correct multiplexer switch positions, loads the corresponding register values, waits for the analog signal path to stabilize, triggers an analog to digital conversion, loads the output of the analog to digital converter into the digital port, and instructs the Digital Port to transmit the requested information. Combined instructions are implemented to provide more than one piece of information transmitted at a single time (e.g., pressure, temperature and sense element diagnostics acquired and transferred in a single transmission), or the system can be instructed to continually transmit a sequence of data (e.g., P1, SDC1, P2, SDC2, P3, SDC3, P4, SDC4, P5, SDC5, P6, SDC6, T1, repeat . . . ). The format of digital data transmission can be customized to meet the customer requirements.

To minimize the complexity and cost of the system, only the minimum amount of electronic calibration of the pressure, temperature and diagnostic signals are provided. The rest of the signal correction will be accomplished with the existing system controller (e.g., microprocessor) through the use of additional coefficients stored in the ASIC. At calibration, the circuit is electronically calibrated via control of the binary register values and all digital settings are stored in Non-Volatile memory in the ASIC (e.g., EEPROM). The sense elements and circuit outputs (pressure, temperature and sense element diagnostics) are then characterized as an assembly over pressure and temperature to determine the operation over the full operating parameter range. From this test data, coefficients suitable to mathematically correct the remaining temperature, pressure and diagnostic signal errors are determined and stored in the ASIC Non-Volatile memory. The conditioning electronics has the ability to communicate the compensation coefficients to the system controller so that it can utilize its existing capabilities; to perform high accuracy, mathematical correction of the pressure, temperature and diagnostic signals.

BRIEF DESCRIPTION OF THE DRAWINGS

The objects, advantages and novel features of the invention will be more fully apparent from the following description when read in connection with the accompanying drawings wherein.

DETAILED DESCRIPTION OF THE PREFERRED EMBODIMENT

Figure 2:
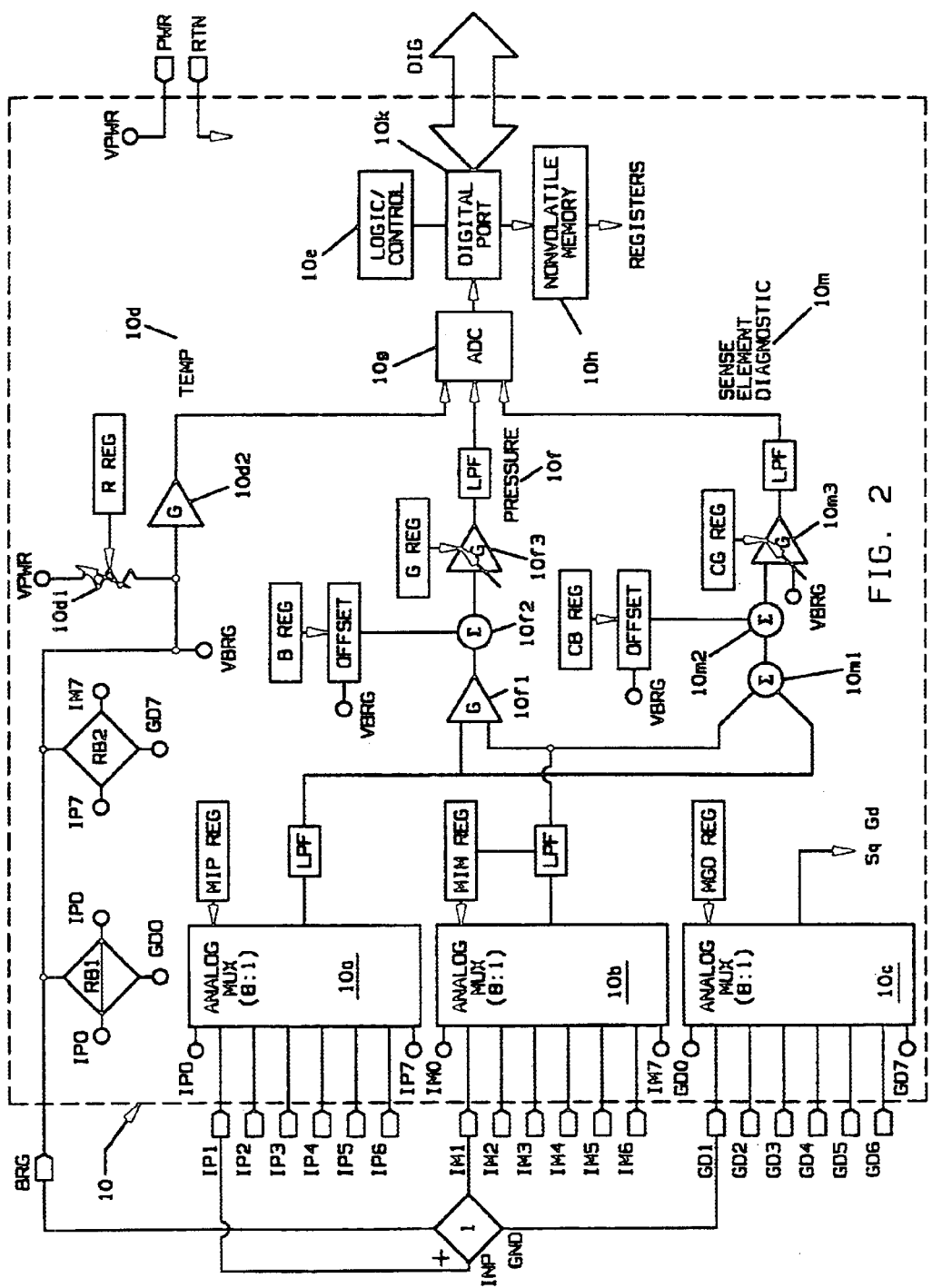
FIG. 2 is a schematic block circuit diagram of the multisense element conditioning ASIC shown in FIG. 1 along with one sense element shown as illustrative.

With particular reference to FIG. 2, numeral 1 indicates a condition responsive sense element in the form of a bridge described above. Although described as being responsive to pressure, it could also be used to sense other conditions such as acceleration, torque and force suitable for such bridge structures.

Figure 1:
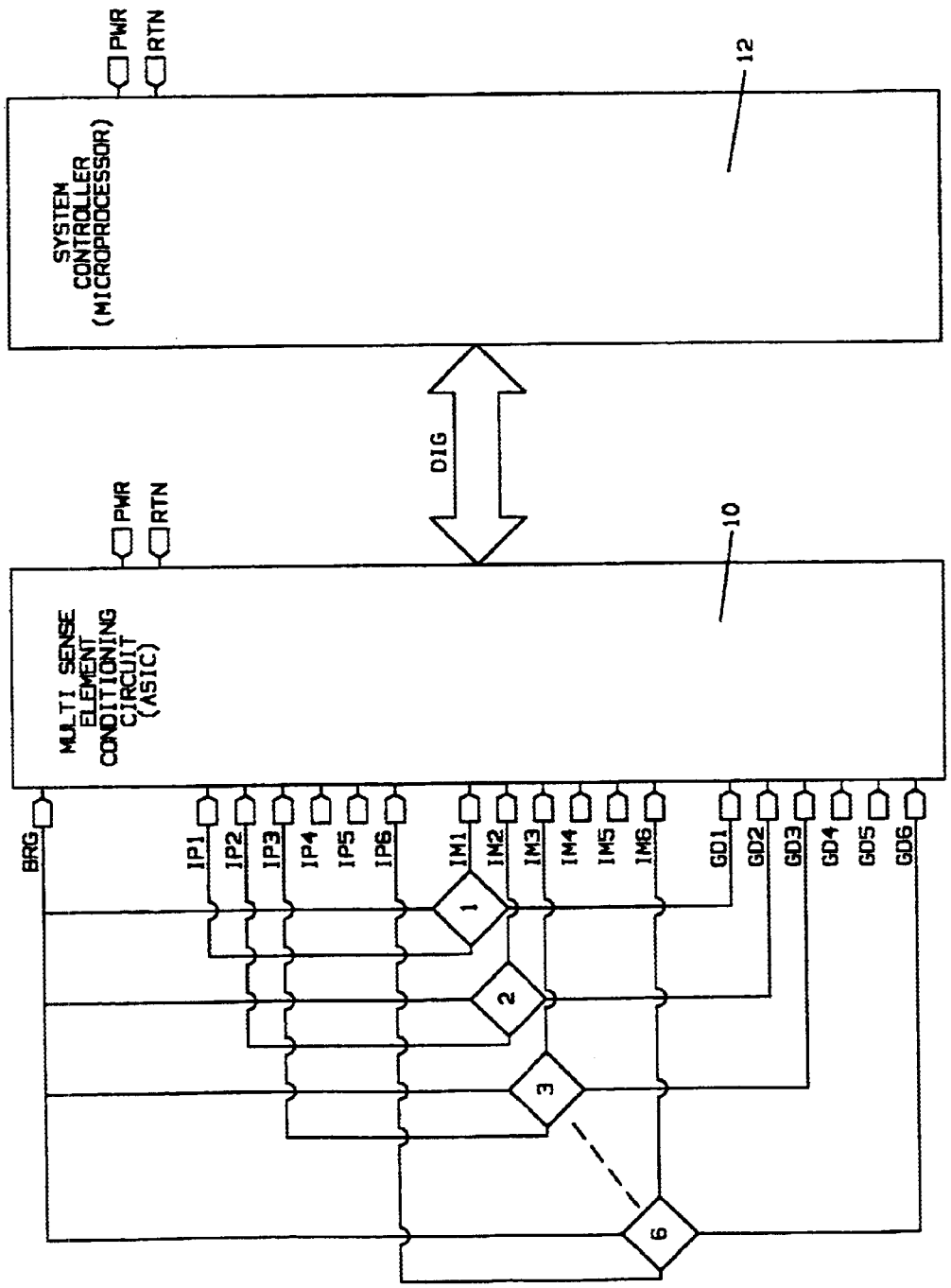
FIG. 1 is a schematic diagram showing a plurality of condition responsive sense elements, a multisense element conditioning circuit in the form of an ASIC and a system controller in the form of a microprocessor.

ASIC (application specific integrated circuit) MSC is formed with first, second and third 8 to 1 analog multiplexers 10a, 10b, 10c respectively at its front end. Multiplexer 10a has eight address positions IPO–IP7; multiplexer 10b has eight address positions IMO–IM7 and multiplexer 10c has address positions GD0–GD7. Each sense element bridge has a bridge node BRG, ground node GND, a plus output node INP and a minus output node INM. Sense element 1 has its plus output node connected to IP1 of multiplexer 10a, its minus output node connected to IM1 and its ground node GND connected to GD1 of multiplexer 10c. The other sense elements are similarly connected to ASIC 10 as shown in FIG. 1. The bridge voltage node of each sense element is connected to a voltage source $V_{pwr}$ through an electronically programmable low temperature coefficient bias resistor 10d1 through node BRG. Electronically programmable bias resistor 10d1 is controlled by register R REG, a digitally controlled variable to adjust the bias resistor connected to a selected sense element bridge that has a relatively high temperature coefficient in order to derive a temperature signal. It should be understood that in some applications the bridges could be biased with a zero valued resistor; however, in the present application a signal proportional to temperature signal is used for circuit compensation of temperature errors. The specific resistance level to correctly bias each bridge is selected at the time of calibration along with offset and gain to be discussed. The bridge voltage $V_{brg}$ is also fed through amplifiers 10d2 to analog to digital converter 10g to be discussed.

Multiplexers 10a, 10b and 10c are controlled by respective registers MIP REG, MIM REG and MGD REG. A sense element is conditioned by setting each multiplexer to the same address position tying the selected sense element bridge ground node to signal ground to complete the bias of the sense element bridge. The plus and minus outputs are multiplexed into a common signal conditioning circuit path 10f. A command is issued by logic control section 10e which synchronizes the control of the various ASIC components. The command calls out of non-volatile memory section 10h and routes all the register values corresponding to the selected sense element bridge to all locations.

The signal conditioning circuit path 10f is used to condition the sensed parameter, in the particular preferred embodiment, pressure. The sense element bridge plus and minus outputs are first fed into a differential gain amplifier 10F1 with the amplifier output connected to an offset correction stage comprising a summing network 10f2 controlled by register B REG to provide an offset correction proportional to voltage $V_{brg}$ which is added to the signal to correct for initial sense element offset error. The offset corrected signal proportional to pressure is then fed to a gain stage comprising a variable gain amplifier 10f3 controlled by register G REG with the resulting conditioned signal then connected to analog to digital converter 10g. Low pass filtering LPF is optionally provided as shown at the input to differential amplifier 10f1 to attenuate inputted noise and at the output of variable gain amplifier 10f3 to customize the pressure response to the system requirements.

Analog to digital converter 10g then converts all the information related to the selected sense element into a digital word and transmits the information through digital port 10k to system controller 12 shown in FIG. 1. This information has offset and gain correction but no thermal correction in order to simplify the ASIC and reduce cost. As will be discussed infra, data needed for providing thermal compensation is stored in non-volatile memory section 10h which is down loaded to system controller 12 upon command enabling controller 12 to make mathematical corrections for the signal.

When logic control 10e selects a sense element for the acquisition of a pressure responsive signal, the sense element plus and minus outputs are also multiplexed into sense element diagnostic circuit path 10m being summed into a summing node 10m1 with the summed signal connected to an offset correction stage comprising a summing network 10m2 proportional to the bridge drive $V_{brg}$ and controlled by register CB REG. The offset corrected signal is then fed to a variable gain stage 10m3 controlled by register CG REG. A low pass filter LPF preferably is used to tune the response of the circuit and the signal is inputted to analog to digital converter 10k. This provides the average of the sense element plus and minus outputs providing information which is independent of the input parameters of temperature and pressure to enable the system controller (12) to analyze this information and determine whether there are any sense elements or sense element connection faults, wherein the diagnostic signal varies beyond a certain boundary.

A second diagnostic tool is provided by fixed test bridges RB1 and RB2 which are formed in the ASIC itself and are adapted to simulate one condition, e.g., zero pressure, and a second condition, e.g., full scale pressure, respectively. At the time of manufacture, the register values of register R REG are selected for bridges RB1, RB2 so that when address 0 for test bridge RB1 is chosen or address 7 for test bridge RB2, the respective bridges are multiplexed through the sense element conditioning circuit path 10f temperature circuit path and the sense element diagnostic circuit path with the appropriate register values. Characterization data, also stored at the time of manufacture, enable the system controller (12) to analyze this information and determine whether there are any faults in the ASIC. The test bridges provide a fixed input that does not vary over time, temperature or other parameter and which allows the analysis to determine whether the temperature pressure and sense element diagnostic circuits are functioning properly at both extremities of the condition, e.g., pressure range.

At the time of manufacture of the ASIC, as well as the sense elements, automated calibration equipment is used in a conventional manner by issuing ASIC via digital port 10k for automatically setting the various registers within the circuit to tune them to the individual sense elements and these calibration coefficients are stored in non-volatile memory section 10h in the ASIC. Thus each sense element has a set of register values stored to enable custom offset, gain, bridge drive and common mode signals so that any variation in such information will be applied to each selected sense element. Once all the information is stored in non-volatile memory the sense elements and ASIC are characterized over pressure and temperature, that is, the ASIC and sense elements are placed in a thermal chamber and pressure is applied to the different sense elements with the output signals entered for each temperature and pressure test points. Three temperature conditions are taken for the sense elements due to non-linear thermal errors while two pressure points suffice because the pressure response is linear. This characterization data of the temperature and pressure matrix is stored in non-volatile memory section 10h. This information enables the system controller to respond to the specific performance of each sense element and perform appropriate mathematical compensation by means, for example, of a look-up table or polynomial coefficient correction to provide high accuracy compensation. Thus, the registers are originally set at two pressures and one temperature to calibrate the sense elements and this calibration then enables characterization at additional temperature and pressure points. Characterization, as used herein, refers to obtaining outputs for these additional temperature and pressure points and storing this data in table form or indirectly as polynomial coefficients without changing or adjusting the original calibration data. This provides a complete matrix of data required to mathematically fully correct the output signals in the system controller.

Digital port 10k is used to transfer digital information to or from system controller 12. The digital port receives commands from the system controller 12 which are suitably verified by logic control 10e, as by conventional parity checks, decoded by the logic control section and performs the necessary function, e.g., select the addresses of the multiplexes, recall the appropriate register settings from non-volatile memory section 10h, initiate analog to digital conversion and then transmission of that data out of digital port 10k to system controller 12. The command can be issued individually to obtain and transmit a single piece of information, e.g., a pressure condition at a specified sense element, a diagnostic signal or other selected information or it could continually issue commands through a selected sequence obtaining data from each of the sense elements and diagnostics, as desired.

The circuit on the ASIC is preferably formed so that data is obtained within a period of time which is short enough that whether the signal is already fully conditioned, i.e., temperature and pressure compensated and multiplexed by the system controller when a piece of information is called for in accordance with the prior art or partially conditioned with the compensation completed within the system controller in accordance with the invention is equivalent, for example, within a fraction of a millisecond.

In accordance with the invention, analog conditioning is effected in the sensor system, i.e., the ASIC providing a signal which is digitized and then compensation of the signal is completed in a host controller with information provided to volatile memory of the host controller from non-volatile memory of the ASIC. According to the invention, a plurality of sensors are multiplexed to a common electrically calibratible temperature, pressure and diagnostic signal conditioning path performing partial compensation of sense element errors which is transmitted to a host controller along with data coefficients enabling the host controller to digitally compensate for each of the sense elements. The test bridges and sense element diagnostic circuit path provide a continuing ability to ensure reliable operation.

Figure 3A:
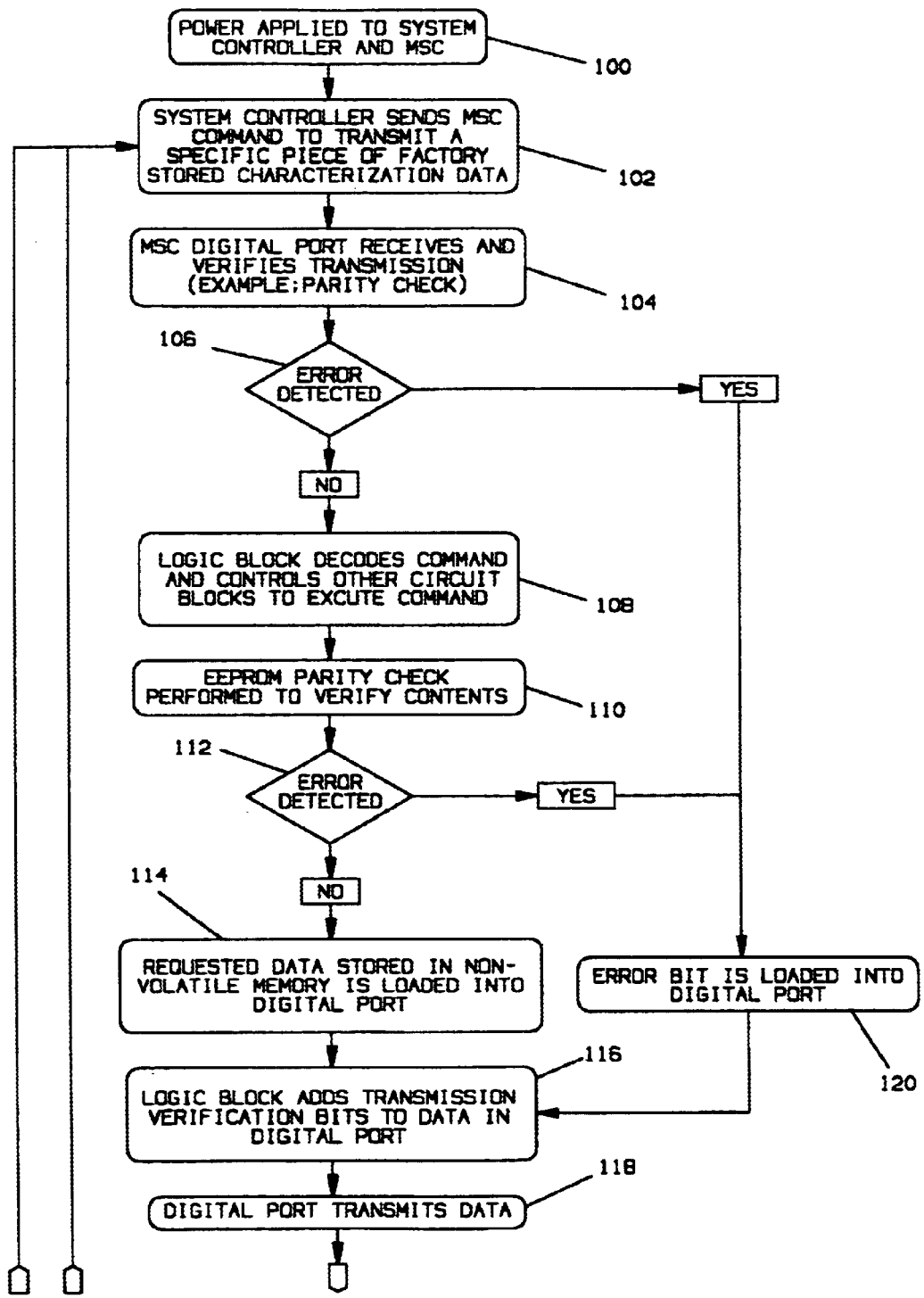
FIGS. 3a, 3b show an initialization sequence for transfer of characterization data from the ASIC to the system controller.
Figure 3B:
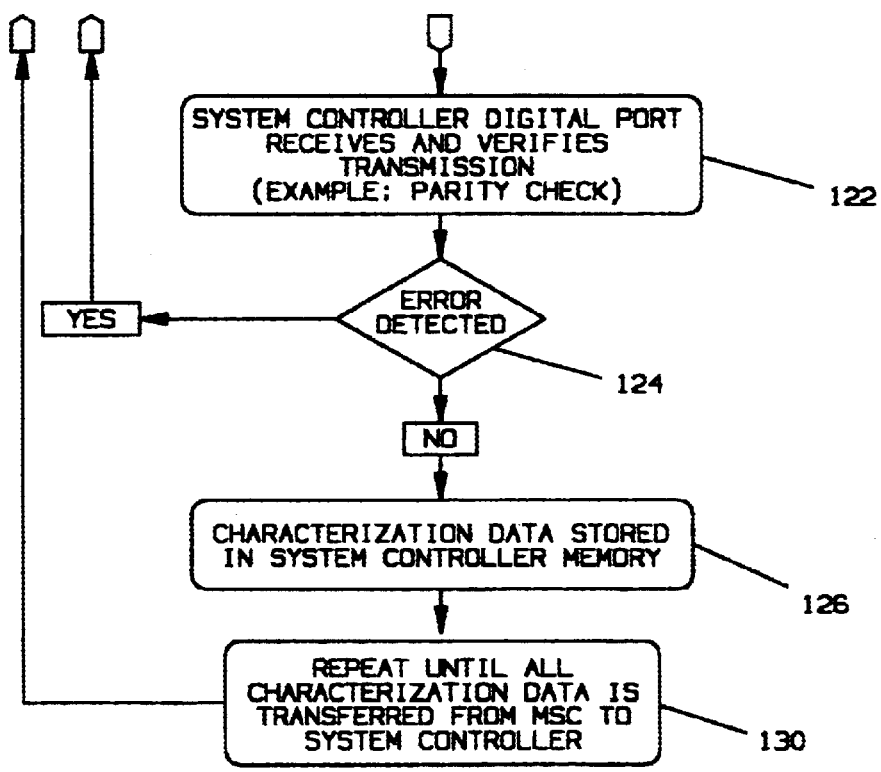

The initialization sequence for transferal of characterization data from the ASIC MSC to the system controller is shown in FIGS. 3a, 3b and includes application of power at 100, sending a command to transfer a specific piece of factory stored characterization data at step 102, transmission verification at step 104 and a decision step 106 to see if an error is detected. A negative decision leads to step 108 of decoding the command and controlling other circuit blocks to execute the command and then to step 110 for a parity check and to decision step 112 to see if an error is detected. A negative response leads to step 114 of loading the requested information into the digital port and then to step 116 adding transmission verification data and step 118 of transmitting the data. A positive response for decision blocks 104 and 112 lead to step 120 in which the error bit is loaded into the digital port.

Following transmission of the data (step 118) the routine goes to step 122 in which the system controller digital port receives and verifies the transmission and then to decision step 124 to see if an error is detected. If no error is detected, the routine proceeds to process step 126 in which the data is stored in system controller memory and then to step 130 which goes to step 102 repeating the whole routine until all the characterization data is transferred from the ASIC MSC to the system controller. A positive decision of decision block 124 is also routed back to step 102.

Figure 4A:
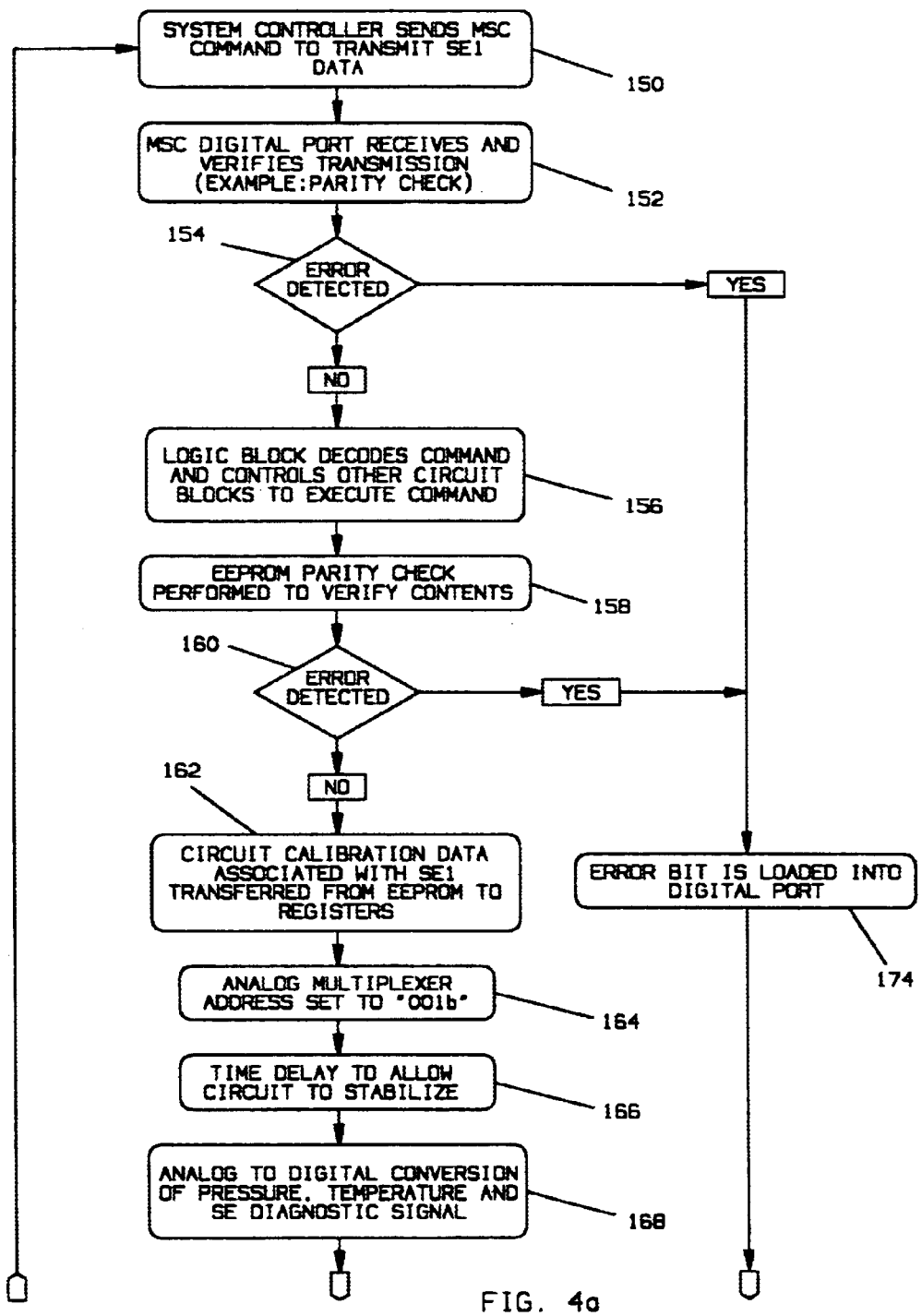
FIGS. 4a, 4b show a data sequence for one sense element (SE1) as an example.
Figure 4B:
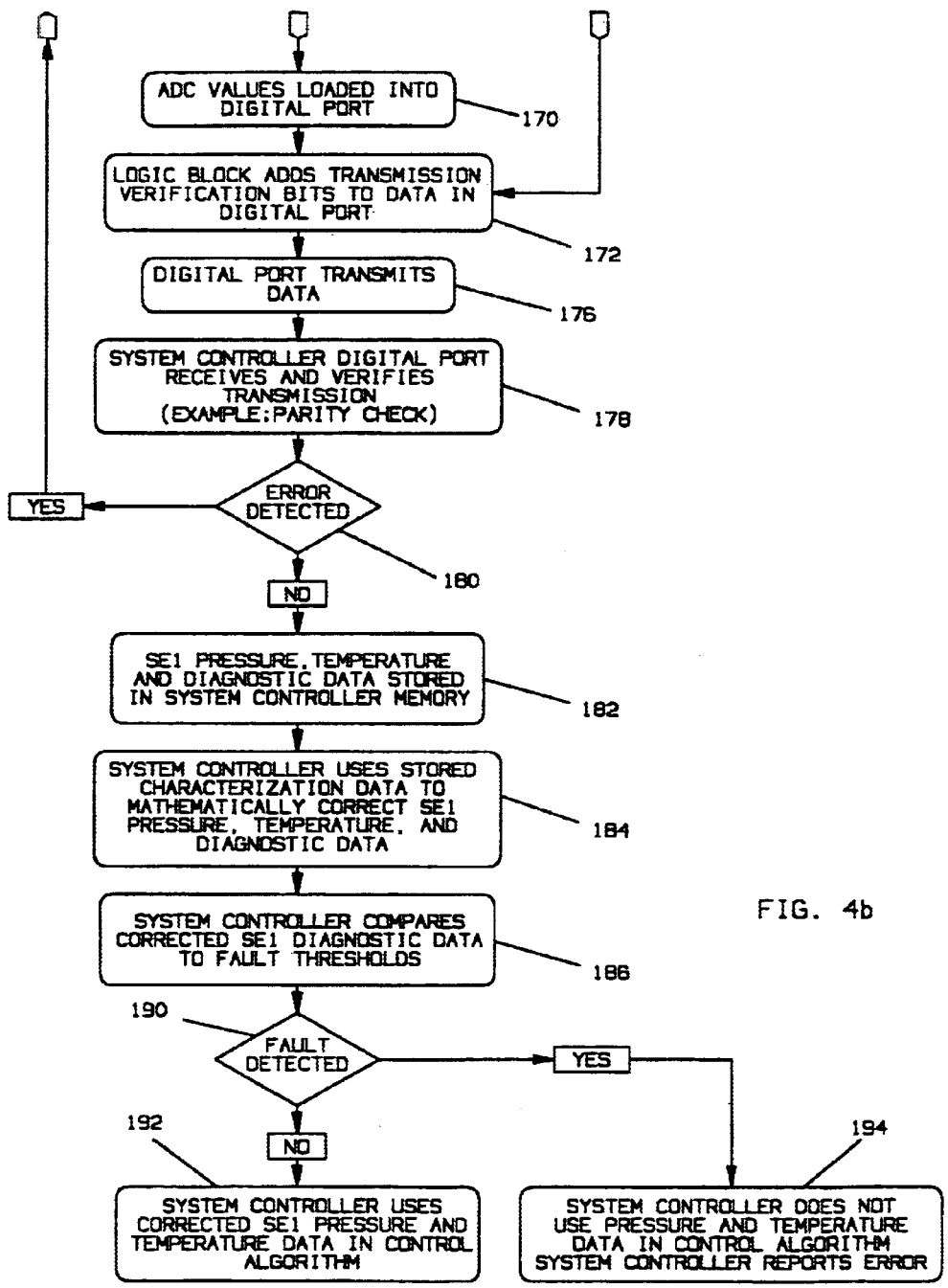

The data acquisition for an exemplary sense element (SE1) is shown in FIGS. 4a, 4b. At step 150 the system controller sends a command to transmit sense element data for element SE1 and at step 152 the digital port receives and verifies the transmission. Decision step 154 determines if an error is detected and upon a negative decision, the routine proceeds to step 156 in which the logic block decodes the command and controls other circuit blocks to execute the command and process step 158 performing a parity check and another error detect decision block 160. A negative response leads to step 162 transferring circuit calibration data associated with the sense element from non-volatile memory to the various registers and then to step 164 setting the address of the analog multiplexers. A time delay is provided to step 166 to allow the circuit to stabilize and then at step 168, analog to digital conversion of pressure, temperature and sense element SE1 diagnostic signal is effected. The ADC values are loaded into the digital port in step 170 and at step 172 the logic block adds transmission bits to data in the digital port. Going back to decision step 154 and 160, positive decisions lead to step 174 in which the detected error bit is loaded into the digital port. Process steps 172 and 174 lead to step 176 in which the digital port transfers the data and on to step 178 in which the system controller digital port receives and verifies the transmission. Then decision step 180 checks whether an error is detected, a positive response directing the routine back to the beginning step 150 and a negative response leading to step 182 storing the SE1 pressure, temperature and diagnostic data in the system controller memory. At step 184 the system controller uses the stored characterization data to mathematically correct the pressure, temperature and diagnostic data of sense element SE1 and then at step 186 the system controller compares the corrected diagnostic data of sense element SE1 to fault thresholds. Decision block 190 checks to see if a fault is detected, a negative response leads to step 192 in which the system controller uses the corrected sense element SE1 pressure and temperature data in a control algorithm and a positive response results in the data not being used in the algorithm and the system controller reporting the error.

Figure 5A:
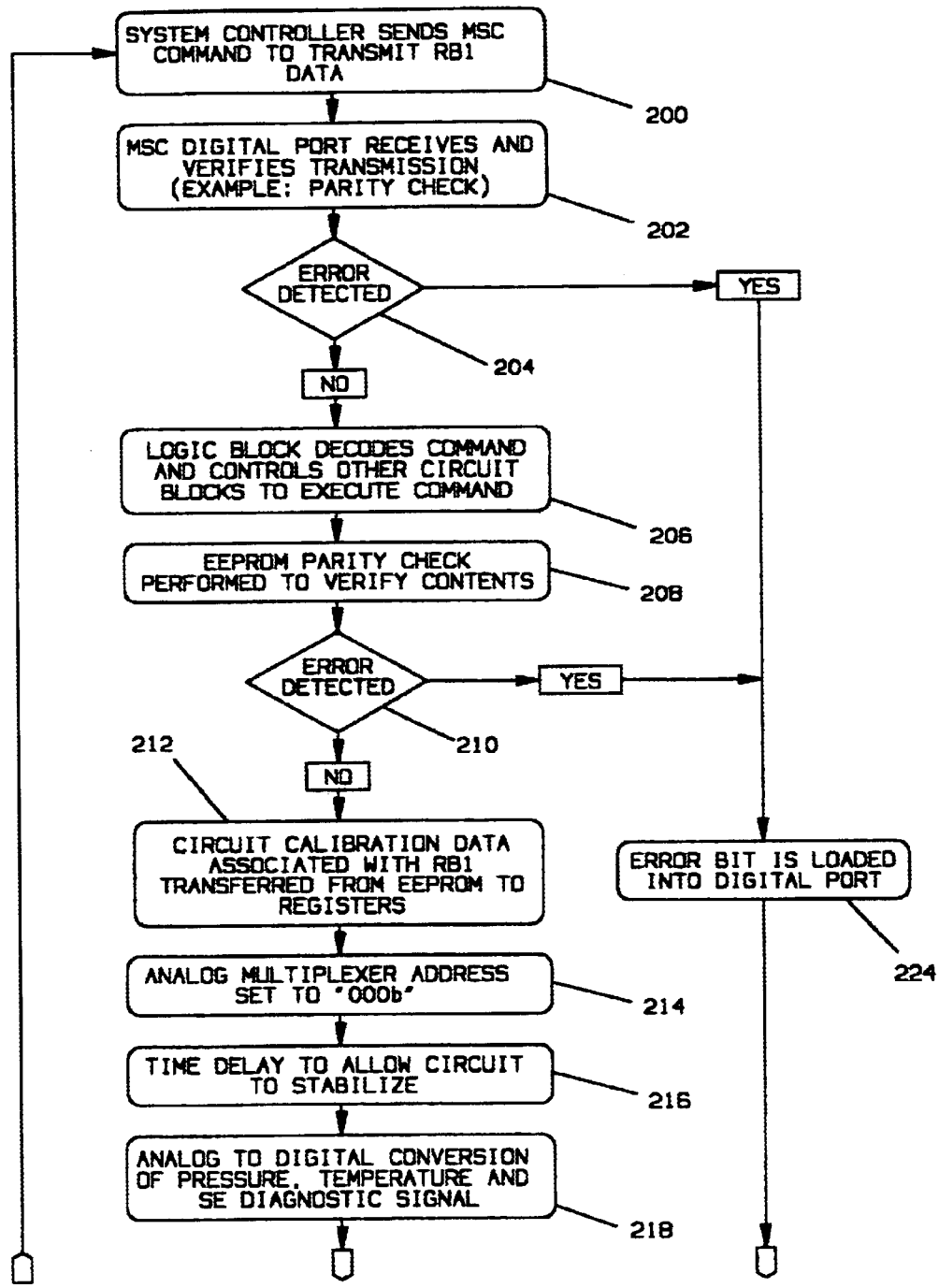
FIGS. 5a, 5b show a diagnostic data acquisition sequence for one reference bridge (RB1) as an example.
Figure 5B:
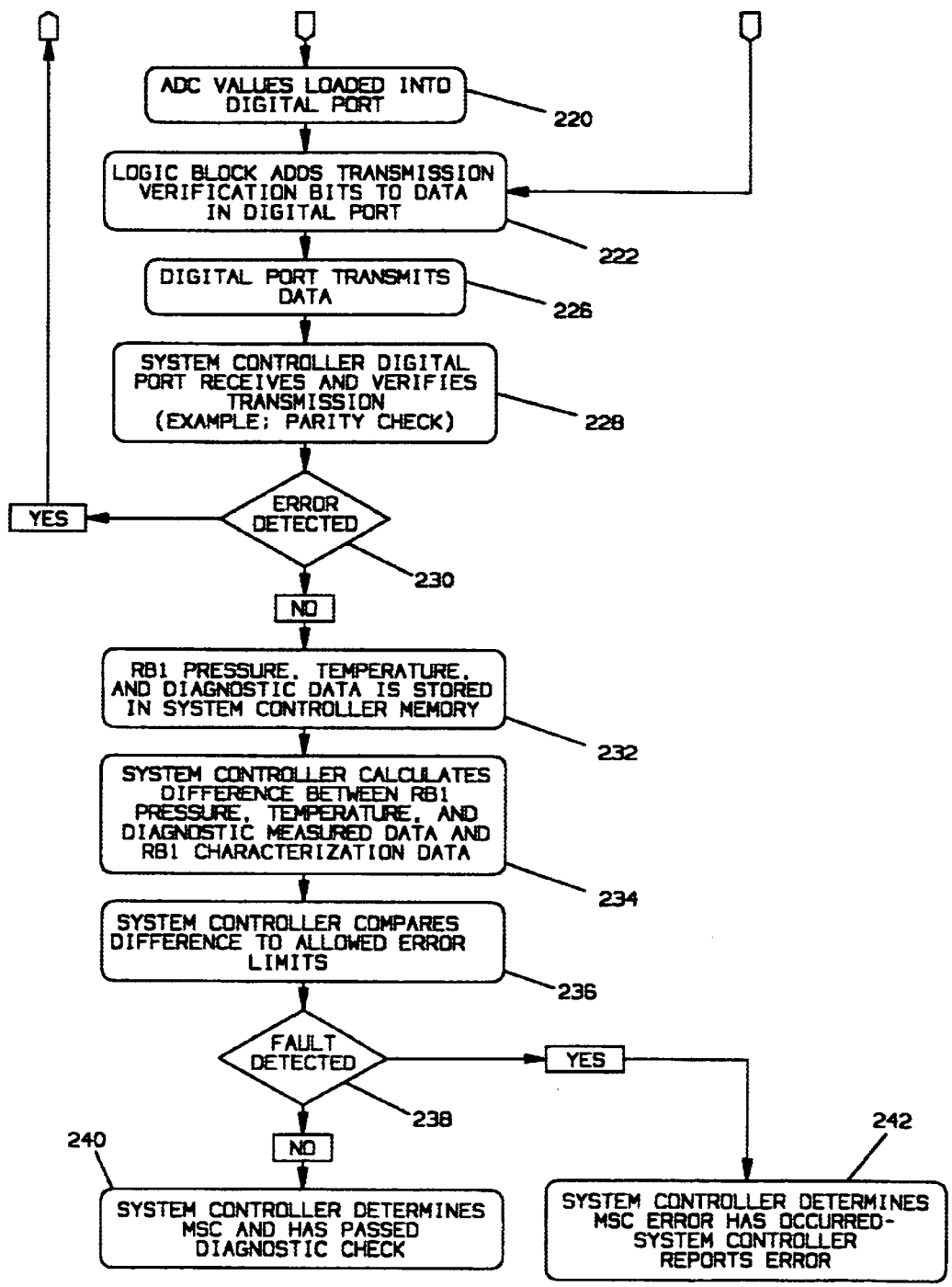

FIGS. 5a, 5b show the diagnostic data acquisition sequence for one of the tests or reference bridges, RB1. The sequence begins at step 200 when the system controller sends a command to the ASIC MSC to transmit bridge RB1 data and then proceeds to step 202 in which the digital port of the ASIC receives and verifies the transmission followed by error detection step 204. A negative response leads to step 206 in which the logic block decodes the command and controls other circuit blocks to execute the command and then to step 208 performing a parity check to verify the contents. A negative response of error detection step 210 leads to step 212 in which circuit calibration data associated with bridge RB1 is transferred from non-volatile memory to the appropriate registers and then to step 214 to set the analog multiplexers address. Step 216 provides a time delay to allow the circuit to stabilize and then the pressure, temperature and sense element diagnostic signal is converted from analog to digital format at step 218. The conversion values are loaded into the digital port at step 220 and at step 222 the logic block adds transmission verification to the data in the digital port. Going back to error detection steps 204 and 210, a detected error leads to step 224 in which the error bit is loaded into the digital port and then to step 222 where verification bits are added. Step 222 then proceeds to step 226 in which the digital port transmits the data and then to step 228 in which the digital port of the system controller receives and verifies the transmission. A detected error results in the routine cycling back to the beginning step 200 and if there is no detected error the routine goes on to step 232 in which the pressure, temperature and diagnostic data of bridge RB1 is stored in the system controller memory. Then the system controller calculates at step 234 the differences between bridge RB1 measured data and the corresponding bridge RB1 characterization data. At process step 236 the system controller compares the differences to allowed error limits and checks to see if an error is detected at step 238. A negative decision leads to step 240 in which the system controller determines that the ASIC has passed the diagnostic check while a positive decision leads to step 242 in which the system controller determines an error has occurred and reports the error.

While a preferred embodiment of the present invention has been disclosed in detail, it should be understood that various modifications, such as using sense elements responsive to acceleration, torque, force and the like mentioned supra, may be adopted without departing from the spirit of the invention or scope of the appended claims. While a preferred embodiment of the present invention has been disclosed in detail, it should be understood that various modifications, such as using sense elements responsive to acceleration, torque, force and the like mentioned supra, may be adopted without departing from the spirit of the invention or scope of the appended claims. Further, it will be understood that, if desired, the bridge bias can be multiplexed rather than or in addition to multiplexing the ground connection.

What is claimed:

1. A condition responsive sense system comprising
   a plurality of condition responsive sense elements having outputs, said condition being sensed being one of pressure, acceleration, force and torque,
   an electronic circuit having at least one multiplexer with addressable inputs connected to the sense elements outputs, the at least one multiplexer having an output connected to a signal conditioning circuit path, the signal conditioning circuit path having conditioning components, nonvolatile memory for storing calibration and characterization data for each of the sense elements and the electronic circuit and a data port for transmitting data from the nonvolatile memory to the multiplexers and to the signal conditioning components for each sense element addressed for conditioning the signals for each sense element and to an external controller to enable the external controller to perform mathematical corrections of the conditioned signal.

2. A condition responsive sensor system according to claim 1 in which the sense elements each comprises a bridge network, each bridge network having a bridge voltage node, a ground node, a plus output node and a minus output node and further comprising an electronically programmable resistor connected in series between a voltage source and each respective bridge voltage node for providing a selected bias to each respective sense node.

3. A condition responsive sense element system according to claim 1 further comprising first and second non-condition responsive test bridge networks formed in the electronic circuit, the test bridge networks each having a bridge voltage node, a ground node, a plus output node and a minus output node, the output nodes connected through a multiplexer to the signal conditioning circuit path, the plus and minus outputs of the first test bridge providing signals of a first value, the plus and minus outputs of the second test bridge providing signals of a second value, the test bridge network providing data for diagnosing electronic circuit faults.

4. A condition responsive sense element system according to claim 1 in which the electronic circuit is an ASIC.

5. A condition responsive sense element system according to claim 1 further comprising a sense element diagnostic circuit path including a summing circuit and conditioning components, the plus and minus outputs of an addressed sense element being connected to the summing circuit and being summed with the summed value fed to the conditioning components of the sense element diagnostic circuit path to provide a diagnostic signal, the stored calibration and characterization data for each of the sense elements and diagnostic circuit path transmitted to the external controller for enabling the external controller to perform mathematical corrections of the diagnostic signal.

6. A condition responsive sense element system according to claim 5 further comprising first and second non-condition responsive sense element test bridge networks formed in the electronic circuit, the test bridge networks each having a bridge voltage node, a ground node, a plus output node and a minus output node, the output nodes connected to the diagnostic circuit path through a multiplexer, the plus and minus outputs of the first test bridge network providing signals of a first value, the plus and minus outputs of the second test bridge network providing signals of a second value, the test bridge networks providing data for diagnosing diagnostic circuit path faults.

7. A condition responsive sense element system according to claim 2 further comprising first and second non-condition responsive sense element test bridge networks formed in the electronic circuit, the test bridge networks each having a bridge voltage node, a ground node, a plus output node and a minus output node, the test bridge networks enabling the diagnoses of sense element bias faults.

8. A condition responsive sense element system according to claim 1 in which the condition being sensed is pressure.

9. A condition responsive sense element system comprising
  a plurality of condition responsive sense elements providing a voltage output dependent on the condition, the condition being sensed being one of pressure, acceleration force and torque, the sense elements each having a bridge network with a bridge voltage node, a ground node, a plus output node and a minus output node,
  a voltage source,
  each bridge voltage node connected to the voltage source,
  an electronic circuit having first, second and third multiplexers, each having an output and a plurality of address input positions, the plus node of each sense element connected to a respective multiplexer address position of the first multiplexer, the minus node of each sense element connected to a respective multiplexer address position of the second multiplexer and the ground node of each sense element connected to a respective address position of the third multiplexer, a respective register connected to each multiplexer,
  a signal ground, the output of the third multiplexer connected to a signal ground,
  a signal conditioning circuit path, the signal conditioning circuit path comprising a differential amplifier having a plus and a minus input and an output, the output of the first multiplexer connected to the plus input of the differential amplifier, the output of the second multiplexer connected to the minus input of the differential amplifier, an offset correction network having a summing circuit with an output and inputs, the input connected to the output of the differential amplifier and an offset circuit controlled by a register to provide a correction proportional to bridge voltage, and a gain correction network having a variable gain amplifier having an input connected to the output of the offset correction network and controlled by a gain correction register,
  a digital port,
  an analog to digital converter having an input and an output, the output of the gain correction network inputted to the analog to digital converter to provide a digital signal corresponding to the sensed condition to the digital port,
  a logic control and a nonvolatile memory section, the nonvolatile memory section being connected to the several registers under the control of the logic control, the digital port forming an interface for transmitting data to and receiving data from an external controller, the nonvolatile memory providing data to the external controller enabling the external controller to perform mathematical error correction for the condition sensor signals and the logic control providing commands for obtaining sense element data from a selected sense element.

10. A condition responsive sense element system according to claim 9 further comprising an electronically programmable resistor connected in series between the voltage source and each respective bridge voltage node for providing a selected bias to each respective sense element when selected and a register for receiving data from nonvolatile memory connected to the electronically programmable resistor to control the value of the resistor.

11. A condition responsive sense element system according to claim 9 in which the condition is pressure.

12. A condition responsive sense element system according to claim 9 further comprising first and second non-condition responsive test bridge networks formed in the electronic circuit, each test bridge network having a bridge voltage node, a ground node, a plus output node and a minus output node, the output nodes and the ground nodes connected respectively to the signal conditioning circuit path and a signal ground through a multiplexer, the plus and the minus output nodes of the first test bridge network providing signals of a first value, the plus and minus output nodes of the second test bridge network providing signals of a second value, the test bridge networks providing data for diagnosing electronic circuit faults.

13. A condition responsive sense element system according to claim 10 further comprising first and second non-condition responsive test bridge networks formed in the electronic circuit, each test bridge network having a bridge voltage node, a ground node, a plus output node and a minus output node, the test bridge networks enabling the diagnoses of sense element bias faults.

14. A condition responsive sense element system according to claim 9 in which the electronic circuit is an ASIC.

15. A condition responsive sense element system according to claim 9 further comprising a sense element diagnostic circuit path including a summing circuit and conditioning components, the plus and minus outputs of an addressed sense element being connected to the summing circuit and being summed with the summed value fed to the conditioning components of the sense element diagnostic circuit path to provide a diagnostic signal, the stored calibration and characterization data for each of the sense elements and diagnostic circuit path transmitted to the external controller for enabling the external controller to perform mathematical corrections of the diagnostic signal.

16. A condition responsive sense element system according to claim 15 further comprising first and second non-condition responsive sense element test bridge networks formed in the electronic circuit, the test bridge networks each having a bridge voltage node, a ground node, a plus output node and a minus output node, the output nodes connected respectively to the diagnostic circuit path and a signal ground through a multiplexer, the plus and minus outputs of the first test bridge network providing signals of a first value, the plus and minus outputs of the second test bridge network providing signals of a second value, the test bridge networks providing data for diagnosing diagnostic circuit path faults.

17. In a condition responsive sensing system having a plurality of condition sense bridge elements, the method comprising the steps of providing a bias for each sense element, providing an electronic circuit having multiplexers, a signal conditioning circuit path having signal conditioning components, an analog to digital converter, logic control, nonvolatile memory and a digital port for transmitting and receiving data, forming the electronic circuit as an ASIC, obtaining electronic calibration data for each sense element during manufacture of the system and storing that information in nonvolatile memory, connecting the electronic controller to an external controller, transmitting data from nonvolatile memory to enable the external controller to perform mathematical corrections to a conditioned digital signal, selecting an address of the multiplexers for connecting outputs of a selected bridge sense element to the signal conditioning circuit path and to transmit basic offset and gain calibration data to send conditioning components in the signal conditioning path, partially conditioning the addressed sense element using the basic offset and gain calibration data transmitted from nonvolatile memory, to provide a partially conditioned signal, converting the partially conditioned signal from an analog format to a digital format in the analog to digital converter to provide a digital signal, transmitting the digital signal to the external controller and completing the conditioning of the partially conditioned signal by performing mathematical corrections to the digital signal in the external controller using the data transferred from the nonvolatile memory.

18. In the method according to claim 17, the additional steps of forming a first non-condition responsive test bridge in the electronic circuit, the first bridge providing a first reference value, forming a second non-condition responsive test bridge in the electronic circuit, the second bridge providing a second reference value, the data from the first and second test bridges providing reference data for diagnostic use of electronic circuit faults.

19. In a condition responsive sensing system having a plurality of condition sense bridge elements, the method comprising the steps of providing a bias for each sense element, forming a sense element diagnostic circuit path the electronic circuit including a summing circuit for summing the plus and minus outputs of the selected sense element and offset and gain components corresponding to the offset and gain correction networks of the signal conditioning circuit path to provide reference data for diagnostic use of sense element and sense element connection faults, providing an electronic circuit having multiplexers, a signal conditioning circuit path having signal conditioning components, an analog to digital converter, logic control, nonvolatile memory and a digital port for transmitting and receiving data, obtaining electronic calibration data for each sense element during manufacture of the system and storing that information in nonvolatile memory, connecting the electronic to an external controller, transmitting data form nonvolatile memory to enable the external controller to perform mathematical corrections to a conditioned digital signal, selecting an address of the multiplexers for connecting outputs of a selected bridge sense element to the signal conditioning circuit paths and to transmit basic offset and gain calibration data to the signal conditioning components in the signal conditioning path, partially conditioning the addressed sense element using the basic offset and gain calibration data transmitted from nonvolatile memory, to provide a partially conditioned signal, converting the partially conditioned signal from an analog format to a digital format in the analog to digital converter to provide a digital signal, transmitting the digital signal to the external controller and completing the conditioning of the partially conditioned signal by performing mathematical corrections to the digital signal in the external controller using the data transferred from the nonvolatile memory.

20. In the method according to claim 18 in which the electronic circuit faults includes faults in the sense element bias.

* * * * *